J. W. BERNARD & J. T. MILLIRON.
TRANSPLANTER.
No. 182,989.          Patented Oct. 10, 1876.
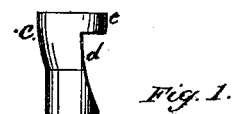
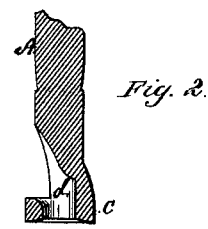
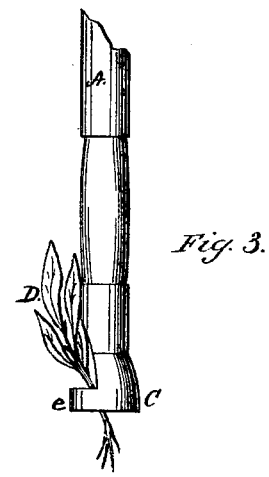

UNITED STATES PATENT OFFICE.

JOHN W. BERNARD AND JEREMIAH T. MILLIRON, OF CALLAWAY COUNTY, MISSOURI.

IMPROVEMENT IN TRANSPLANTERS.

Specification forming part of Letters Patent No. 182,989, dated October 10, 1876; application filed August 12, 1876.

*To all whom it may concern:*

Be it known that we, JOHN W. BERNARD and JEREMIAH T. MILLIRON, of the county of Callaway and State of Missouri, have invented certain new and useful improvements in an implement for setting out tobacco and other plants that are usually transplanted; and we do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1 represents a vertical view of our transplanting implement, with the pointed end downward for making the hole in the ground in which to insert the plant. Fig. 2 shows a broken-off sectional view of the other end of the implement for receiving and setting the plant. Fig. 3 is a broken-off lower portion of the implement, with a plant inserted in position for setting.

Our invention consists in a simple bar of wood or metal, of any desired length or size, pointed and formed at one end so as to make a hole in the ground of the required depth, the other end of the bar or shaft being provided with a cavity or socket in which to insert the plant for setting out.

That others may be enabled to make and use our transplanting implement, we will describe it more in detail, referring to the drawings and the letters thereon.

The shaft or bar A may be made of hard wood or of metal, of any desired length or size, one end of which is brought to a point, $a$, in the form of a curvilinear cone, above which is an enlarged curvilinear bulb, B, for enlarging the hole at the top, so that the plant may be easily set in place without the loose earth falling in before it. On the reverse end of the bar A, in the enlarged portion C, a cavity, $d$, is made, into which the plant D is inserted, the root portion extending down through and below the ring $e$ on the end when the plant is placed in the hole; then the implement is pressed down, forcing the earth around the roots; then gently raise the implement and the plant is set out.

Thus it will be seen that much time and labor will be saved in transplanting tobacco and other plants by the use of our invention, as the operator will not be required to stoop or get down on his knees to place the plants upright in the holes and compress the soil around them.

We do not claim a dibbling-tool for making a hole in the ground for the insertion of the root; but We do claim—

The head C, cavity $d$, and ring $e$ on the opposite end of a dibbler, for the purpose specified.

In testimony that we claim the foregoing as our own we affix our signatures in presence of two witnesses.

JOHN W. BERNARD.
JEREMIAH T. MILLIRON.

Witnesses:
S. A. NICHOLS,
JNO. A. FLOOD.